US009245453B1

(12) United States Patent
Macalister

(10) Patent No.: US 9,245,453 B1
(45) Date of Patent: Jan. 26, 2016

(54) FLIGHT SIMULATOR YOKE

(76) Inventor: Doug Macalister, Glendale, AZ (US)

( * ) Notice: Subject to any disclaimer, the term of this patent is extended or adjusted under 35 U.S.C. 154(b) by 517 days.

(21) Appl. No.: 13/567,977

(22) Filed: Aug. 6, 2012

Related U.S. Application Data

(63) Continuation-in-part of application No. 12/263,242, filed on Oct. 31, 2008, now Pat. No. 8,235,723.

(60) Provisional application No. 61/028,674, filed on Feb. 14, 2008.

(51) Int. Cl.
*G09B 9/28* (2006.01)
*G09B 9/02* (2006.01)

(52) U.S. Cl.
CPC ... *G09B 9/28* (2013.01); *G09B 9/02* (2013.01)

(58) Field of Classification Search
CPC .............. G09B 9/00; G09B 9/02; G09B 9/08; G09B 9/28; G09B 19/16; G09B 19/165; A63F 13/06
USPC ............ 434/29, 30, 35, 45; 463/37, 38; 446/7
See application file for complete search history.

(56) References Cited

U.S. PATENT DOCUMENTS

| | | | | |
|---|---|---|---|---|
| 2,519,233 A | * | 8/1950 | Davis .................. | G09B 9/28 434/45 |
| RE24,701 E | * | 9/1959 | Redmond ............. | G05G 1/06 318/580 |
| 2,923,503 A | * | 2/1960 | Vogel .................. | B64C 13/04 244/223 |
| 2,940,699 A | * | 6/1960 | Plummer .............. | B64C 13/46 244/228 |
| 3,007,258 A | | 11/1961 | Hemstreet et al. | |
| 3,024,539 A | * | 3/1962 | Rider ................... | G09B 9/28 434/45 |
| 3,303,714 A | | 2/1967 | Fontaine | |
| 3,303,715 A | | 2/1967 | Zimer | |
| 3,378,938 A | * | 4/1968 | Frasca ................. | G09B 9/28 434/45 |
| 3,526,043 A | * | 9/1970 | Frasca ................. | G09B 9/16 434/32 |
| 3,534,486 A | * | 10/1970 | Frasca ................. | G09B 9/16 434/32 |
| 3,805,413 A | | 4/1974 | Burny et al. | |
| 4,024,651 A | * | 5/1977 | Lantrip ................ | G09B 9/28 244/223 |
| 4,250,636 A | * | 2/1981 | Horwitz ............... | G09B 9/28 434/55 |
| 4,422,851 A | | 12/1983 | Hayashigawa et al. | |
| 4,568,286 A | | 2/1986 | Acklam | |
| 4,659,313 A | * | 4/1987 | Kuster ................. | G09B 9/28 345/156 |
| 4,713,007 A | * | 12/1987 | Alban .................. | G09B 9/28 244/223 |
| 4,820,162 A | | 4/1989 | Ross | |
| 4,861,269 A | | 8/1989 | Meenen, Jr. | |
| 4,907,970 A | | 3/1990 | Meenen, Jr. | |
| 5,125,602 A | | 6/1992 | Vauvelle | |
| 5,286,024 A | * | 2/1994 | Winblad .............. | G05G 9/047 273/148 B |

(Continued)

FOREIGN PATENT DOCUMENTS

| | | |
|---|---|---|
| WO | 2006010841 | 2/2006 |
| WO | 2006010842 | 2/2006 |

*Primary Examiner* — Gene Kim
*Assistant Examiner* — Alyssa Hylinski
(74) *Attorney, Agent, or Firm* — Schmeiser, Olsen & Watts LLP

(57) ABSTRACT

A flight simulator yoke is provided having a single handle having a handgrip and yoke shaft operable from a left side of a user, wherein a neutral position for the handle is at a 45 degree angle. The yoke may further include two trim axes parallel to each other; and two moveable spring devices. The spring devices are operatively coupled to the trim axes, each spring device having a positive center detent, wherein the positive center detent requires a predetermined amount of force in order to move the yoke along each trim axis. The flight simulator yoke may simulate a yoke of a Cirrus aircraft.

9 Claims, 16 Drawing Sheets

(56) References Cited

U.S. PATENT DOCUMENTS

| | | | | |
|---|---|---|---|---|
| 5,436,640 A * | 7/1995 | Reeves | ............... | G05G 9/047 345/161 |
| 5,470,232 A * | 11/1995 | Kelso | ............ | G09B 9/28 434/45 |
| 5,522,568 A | 6/1996 | Kamen et al. | | |
| 5,630,756 A * | 5/1997 | Thurston | ............ | A63F 13/06 273/148 B |
| 6,004,134 A | 12/1999 | Marcus et al. | | |
| 6,036,495 A | 3/2000 | Marcus et al. | | |
| 6,429,849 B1 * | 8/2002 | An | ............ | G05G 9/047 345/161 |
| 6,482,010 B1 | 11/2002 | Marcus et al. | | |
| 6,573,885 B1 * | 6/2003 | McVicar | ............ | F16D 3/382 345/156 |
| 6,851,950 B1 * | 2/2005 | Gamnig | ............ | G09B 9/08 434/30 |
| 8,235,723 B2 * | 8/2012 | Macalister | ............ | G09B 9/08 434/30 |

* cited by examiner

FLIGHT SIMULATOR YOKE

CROSS REFERENCE TO RELATED APPLICATION

This application is a continuation-in-part of U.S. patent application entitled "FLIGHT SIMULATOR YOKE," Ser. No. 12/263,242, filed Oct. 31, 2008, which claims priority to U.S. Provisional Patent Application entitled "FLIGHT SIMULATOR YOKE," Ser. No. 61/028,674, filed Feb. 14, 2008, the disclosures of which are hereby incorporated entirely herein by reference.

BACKGROUND OF THE INVENTION

1. Technical Field

This invention relates generally to a flight simulator yoke and more particularly to a flight simulator yoke for a Cirrus SR20 aircraft.

2. State of the Art

There are several types of simulator yokes currently available that provide the ability to simulate the feel of a yoke a particular aircraft. This allows for interactive training of a pilot and allows them to learn particular aspects of flying without the need of actually flying an aircraft.

All light aircraft in the past have had either a joystick in the center, or a "broken steering wheel" type yoke. A new company named "Cirrus Design" has built an entirely new aircraft with an entirely new control system. This control is different from any other light aircraft. This control, without limitation, is visually different, moves differently, is spring loaded differently, is positioned differently in the cockpit, and its electric trim function actually moves the yoke.

Specifically, the Cirrus yoke is different in the following ways. [Describe each difference.]

The use of conventional simulator yokes are becoming more popular, particular in instances where those training to be a pilot may utilize a particular number of hours spent in a simulator as actual flight time. These conventional flight simulator yokes however have their limitations.

Among other limitations and for exemplary purposes only, conventional flight simulators are limited in their ability to accurately simulate all types of aircraft yoke. Particularly, there is no conventional simulator yoke for simulating a Cirrus SR20 aircraft. Further, conventional simulator yokes are limited in their ability to simulate an electric trim that actuates a mechanical response of an aircraft within a portable unit. Further still, conventional simulator yokes do not provide for a positive spring detent in two axes.

Accordingly, there is a need in the field of flight simulator yokes for an improved flight simulator yoke to overcome the limitations of conventional simulator yokes.

DISCLOSURE OF THE INVENTION

The present invention relates to a single handed flight simulator yoke for placement on a left side of the pilot. The simulator yoke simulates the function and operation of a Cirrus SR20 yoke. It is important to note that in order for a simulator yoke to be of value, it is necessary to mimic an actual yoke. It is in the realistic simulation of the operation and feel of a Cirrus yoke that provides pilot training, which ultimately aides in saving lives by simulating what the pilot in training will experience in a real Cirrus aircraft. Simulation has become a more critical component in the training of pilots due in part to the fact that simulation hours can be utilized as flight hours in a student pilot's training requirements. Without accurate simulation of the aircraft being trained on, the student pilots' training is lacking, inefficient and unsafe. Accordingly, a flight simulator is provided that enables a student pilot to train on a simulation yoke that accurately and realistically mimics a Cirrus yoke.

All light aircraft in the past have had either a joystick in the center, or a "broken steering wheel" type yoke. A new company named "Cirrus Design" has built an entirely new aircraft with an entirely new control system. This control is different from any other light aircraft. This control, without limitation, is visually different, moves differently, is spring loaded differently, is positioned differently in the cockpit, and its electric trim function actually moves the yoke. This simulator yoke accurately addresses all these differences in a compact desktop unit, which can then be incorporated into any training device or simulator, for training pilots in the operation of the Cirrus aircraft.

Aspects of the Cirrus yoke that differ from conventional aircraft yokes include: (1) a different look, wherein the Cirrus yoke has a pistol grip like a joystick, but it is connected to a horizontal shaft like a yoke; (2) it moves differently, wherein the left/right axis is rotational about a center point that is tilted 45 degrees right, the forward and back axis is linear; (3) it is spring loaded differently, wherein most aircraft have a soft center detent, but the Cirrus is so heavily spring loaded that it requires several pounds of pressure to begin moving it off the center detent; (4) it is positioned differently in the cockpit, namely it is at the far left of the panel, wherein the neutral left/right rotation is tilted 45 degrees right and corresponds to a long arm rest in the door which causes the pilots hand to comfortably rest on the tilted pistol grip; and (5) it has a unique electric trim, wherein a thumb switch on the pistol grip (or the autopilot, if engaged) cause motors to actually move the detent positions of the yoke, allowing the pilot to still manually control the aircraft, but when the control is released, the aircraft will fly according to the trim setting prior to manual control, or as the autopilot directs, if it is engaged.

An aspect of particular embodiments of the invention may include a portable flight simulator yoke comprising a single handle having a handgrip and yoke shaft, wherein a first neutral position for the handle is at a 45 degree angle. Embodiments of the flight simulator yoke may further comprise a first trim axis comprising a potentiometer to measure linear movement of the single handle and a second trim axis substantially parallel to the first trim axis, wherein the second trim axis comprises a potentiometer to measure rotational movement of the single handle. Additionally, embodiments may also comprise a first and second moveable spring devices, each operatively and respectively coupled to the first and second trim axes such that movement of the single handle is measured by the potentiometers in response to movement of the spring devices, each spring device having a positive center detent, wherein the positive center detent requires a predetermined amount of force in order to move the yoke along each trim axis.

Embodiments of a portable flight simulator yoke may further comprise an electric trim having two bi-directional motors adapted to trim the yoke without manual input on the handle; and a translation mechanism to translate rotational movement of the handle to linear movement of the second moveable spring device. Additionally, embodiments may also include a circuit electrically coupled to the potentiometers, the circuit comprising connection ports to operatively connect to a computer running flight simulation software.

Another aspect of particular embodiments of the invention may include a flight simulator having a flight simulator yoke, the simulator comprising a seat, a control panel, screens for displaying flight information and simulation, throttle controls, pedals and a flight simulator yoke. The yoke includes a single handle having a handgrip and yoke shaft, wherein a neutral position for the handle is at a 45 degree angle; a first trim axis comprising a potentiometer to measure linear movement of the single handle; a second trim axis substantially parallel to the first trim axis, wherein the second trim axis comprises a potentiometer to measure rotational movement of the single handle; and a first and second moveable spring devices, each operatively and respectively coupled to the first and second trim axes such that movement of the single handle is measured by the potentiometers in response to movement of the spring devices, each spring device having a positive center detent, wherein the positive center detent requires a predetermined amount of force in order to move the yoke along each trim axis.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a single handed flight simulator yoke for placement on a left side of the pilot. The simulator yoke simulates the function and operation of a Cirrus SR20 yoke. Generally, a simulator yoke according to present invention is necessary to realistically mimic an actual Cirrus SR20 yoke in operation and feel. The realistic operation and feel of the simulator yoke provides pilot training, which ultimately aides in saving lives by simulating what the pilot in training will experience in a real Cirrus aircraft. Each component selected and utilized by embodiments of the present invention are intended to replicate the feel and provide the proper feedback to the student pilot in order to provide proper training.

Figure 1:
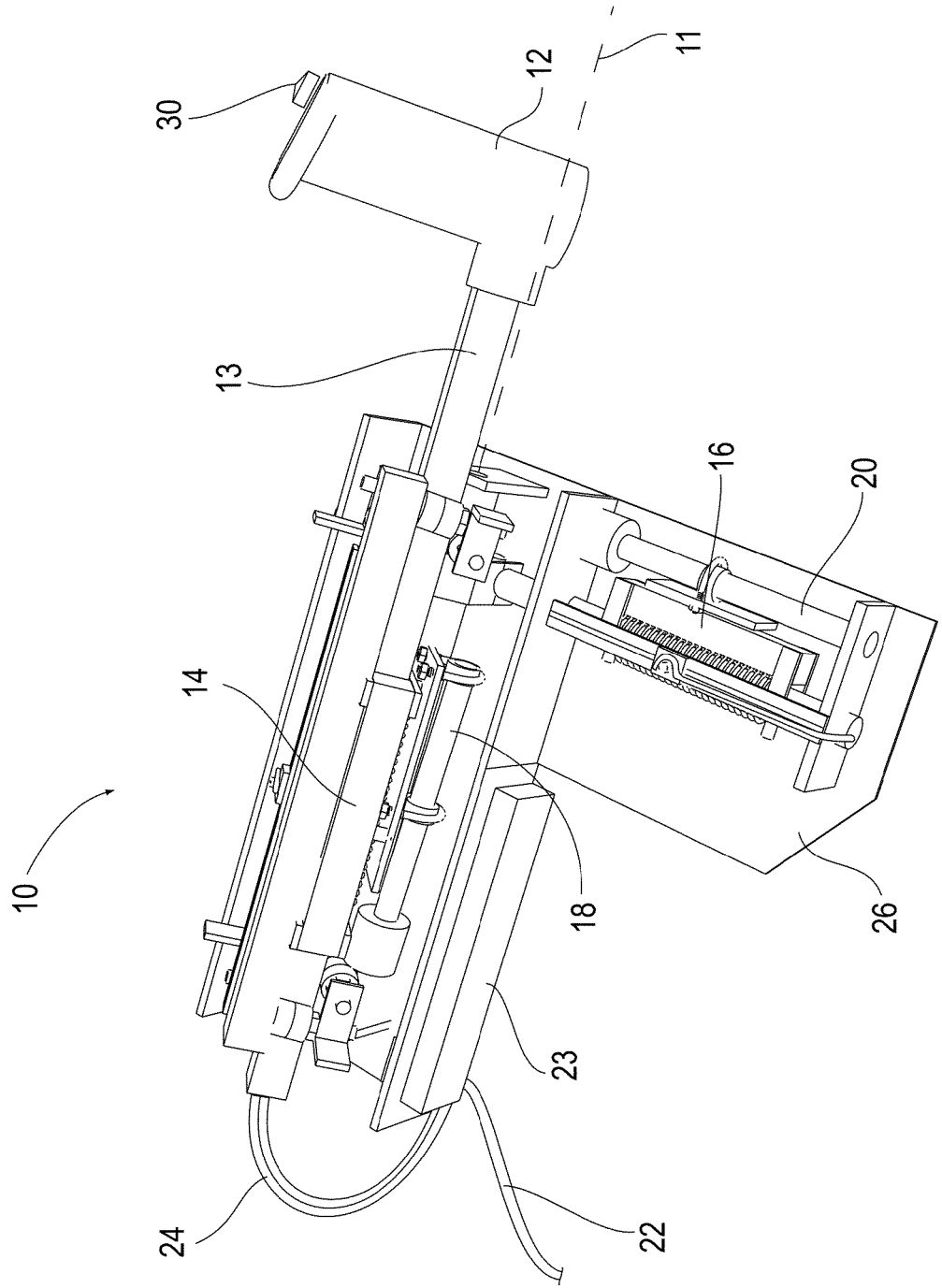
FIG. 1 is a perspective view of a flight simulator yoke in accordance with the present invention.

Referring to the drawings, FIG. 1 depicts a perspective view of a single handle flight simulator yoke 10 according to particular embodiments of the present invention. The simulator yoke 10 may include a handgrip 12, a yoke shaft 13, a first trim axis 18 and a second trim axis 20. The handgrip 12 is coupled to the yoke shaft 13 and allows the handgrip 12 and the yoke shaft 13 to move rotationally about a rotation axis 11, wherein the rotation axis 11 is a predetermined distance from an axis of the yoke shaft 13. The simulator yoke 10 may further include a first spring device 14 and a second spring device 16. Further still, the simulator yoke 10 may include a trim thumb switch 30 for controlling the electric trim as will be discussed in greater detail with respect to FIGS. 2A, 2B and 3.

The hand grip 12 simulates the hand grip of a Cirrus SR20 in all aspects including finger recesses as well as being positioned at approximately a forty-five degree angle. The hand grip 12 includes a thumb switch 30. The thumb switch 30 may be operatively coupled to each trim axis 18 and 20. As the thumb switch 30 may be moveable back and forth in at least two directions. The direction is associated with the each trim axis 18 and 20. The movement of the thumb switch activates the movement of the electric trim axes 18 and 20.

Figure 2A:
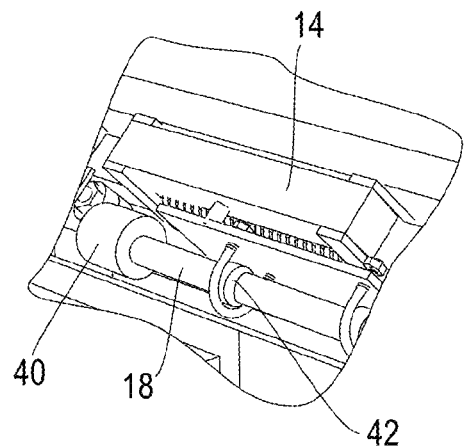
FIGS. 2A-2B are perspective views of a first spring device of a flight simulator yoke in accordance with the present invention.
Figure 2B:
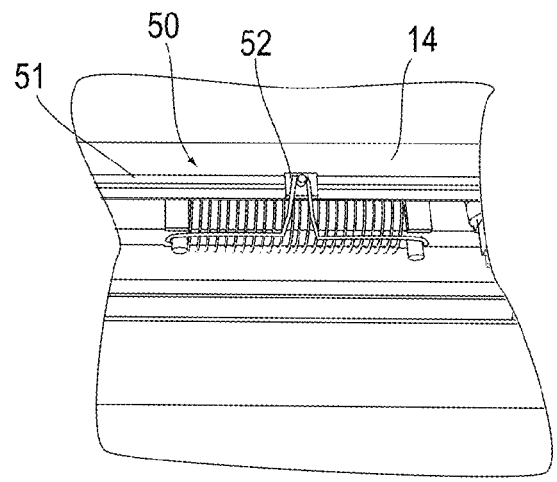

With additional reference to FIGS. 2A and 2B, the first electric trim axis 18 includes a motor 40 and a spring device coupler 42. The motor 40 may be a bi-directional motor that allows rotation in two directions. The first trim axis 18 may be a worm driven axis wherein the spring device coupler 42 travels linearly along the first trim axis 18 in response to the rotation of the trim axis 18 in each rotational direction. The spring device coupler 42 is coupled to the first spring device 14. Therefore, the translational movement of the spring device coupler 42 also moves the spring device linearly along the first trim axis 18 in response to the rotation of the first trim axis 18.

The first spring device 14 has a center position with a positive detent, wherein it requires a predetermined amount of force to manually move the hand grip 12 and the yoke shaft in a direction along the first trim axis 18. Movement of the spring device 14 along the first trim axis 18 moves the center of the first spring device 14 in response to the adjustment of the electric trim by use of the thumb switch 30. This accurately simulates the movement of the center detent of the Cirrus SR20 yoke, wherein the center moves in response to the trim adjustments.

Figure 3:
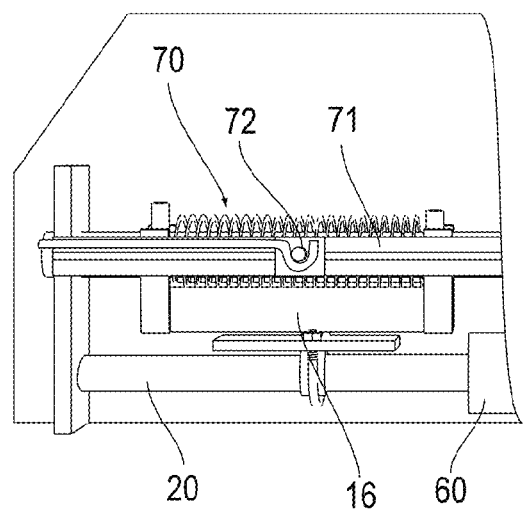
FIG. 3 is a top view of a second spring device of a flight simulator yoke, in accordance with the present invention.

Referring further to the drawings and particularly to FIG. 3, the second electric trim axis 20 includes a motor 60 and a spring device coupler (not shown). The motor 60 may be a bi-directional motor that allows rotation in two directions. The second trim axis 20 may be a worm driven axis wherein the spring device coupler travels linearly along the second trim axis 20 in response to the rotation of the trim axis 20 in each rotational direction. The spring device coupler is coupled to the second spring device 16. Therefore, the translational movement of the spring device coupler also moves the spring device linearly along the second trim axis 20 in response to the rotation of the second trim axis 20.

The second spring device 16 has a center position with a positive detent, wherein it requires a predetermined amount of force to manually move the hand grip 12 and the yoke shaft in a direction along the second trim axis 20. Movement of the spring device 16 along the second trim axis 20 moves the center of the second spring device 16 in response to the adjustment of the electric trim by use of the thumb switch 30. This accurately simulates the movement of the center of the Cirrus SR20 yoke, wherein the center moves in response to the trim adjustments.

The simulator yoke 10 may further include a second resistor 70 coupled adjacent the second spring device 16. The second resistor 70 includes a stationary portion 71 held in a position adjacent the second spring device 16 and substantially parallel to the second trim axis 20. The second resistor further includes a moveable portion 72 that is operative coupled to the second spring device 16, wherein the moveable portion 72 moves in response to movement of the second spring device 16. The second resistor 70 may be utilized to communicate the position of the second spring device 16 and the center of the second spring device 16 in order to accurately communicate that position to a computer for use in a simulated flight.

Figure 4A:
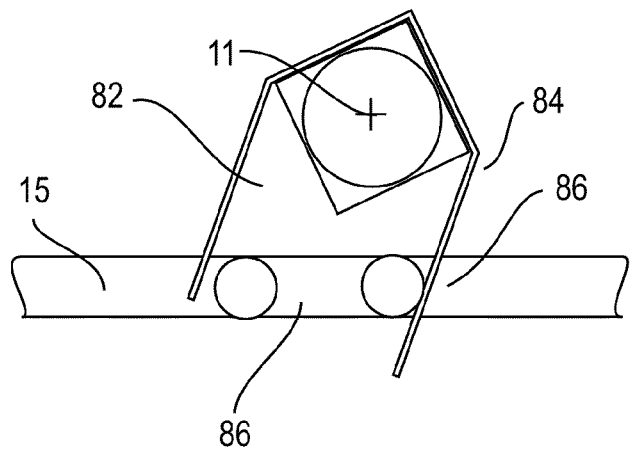
FIGS. 4A-4C are end views of a translation mechanism of a flight simulator yoke in accordance with the present invention.
Figure 4B:
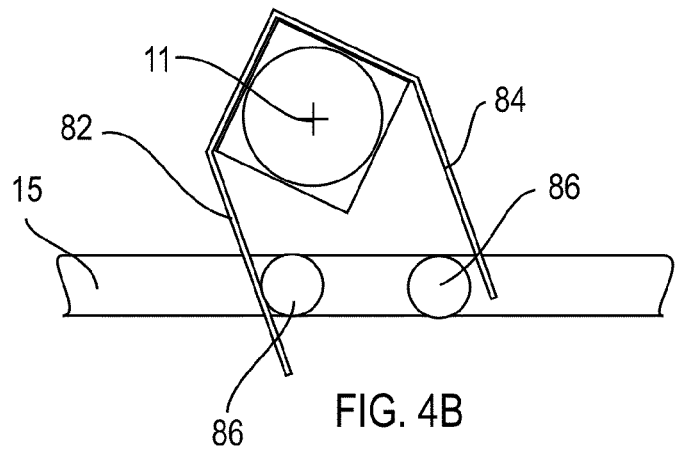
Figure 4C:
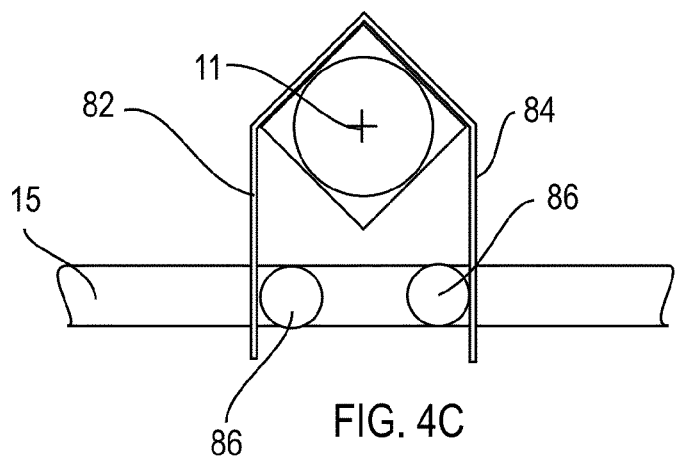

Referring further to the drawings, FIG. 4 depicts a translation mechanism 80 of a flight simulator yoke in accordance with the embodiments of the present invention. The translation mechanism 80 allows for the rotational movement of the handgrip 12 and the yoke shaft 13 about the rotation axis 11, wherein the rotation axis 11 is a predetermined distance from an axis of the yoke shaft 13. In order for the rotational movement of the handgrip 12 and the yoke shaft 13 to simulate the rotational movement of a Cirrus SR20 yoke, there needed to be a translation of the rotational movement of the handgrip 12 and yoke shaft 13 into a linear movement along the direction of the second trim axis 20. Accordingly, the translation mechanism 80 provides this translational movement. The translation mechanism 80 may include a bracket having opposing cantilevered sides 82 and 84. The sides 82 and 84 may be preloaded with a predetermined amount of force in order to maintain the proper operation of the translation mechanism 80. The translation device may further include a plurality of bearings or rollers 86 coupled on opposing sides of a translation shaft 15. The translation shaft 15 operatively engages the second spring device 16, wherein the second spring device 16 provides a center detent that requires a predetermined force in order to rotate the handgrip 12 and the yoke shaft 13.

In operation, one of the sides 82 and 84 of the translation mechanism 80 engages a portion of the bearings or rollers 86 and moves the bearings in a linear direction substantially similar to the direction of the second trim axis 20. The translation shaft 15 move linearly in a simultaneous response to the movement of the bearings 86. The side 82 or 84 that engages the bearings 86 is dependent upon the direction of rotation of the handgrip 12.

Figure 5A:
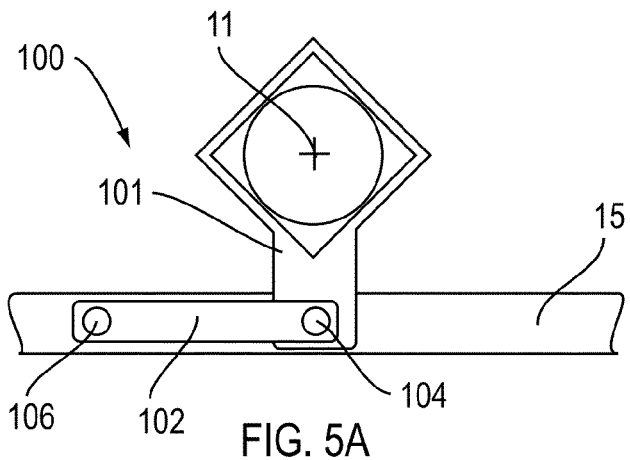
FIGS. 5A-5C are end views of an alternate embodiment of a translation mechanism of a flight simulator yoke.
Figure 5B:
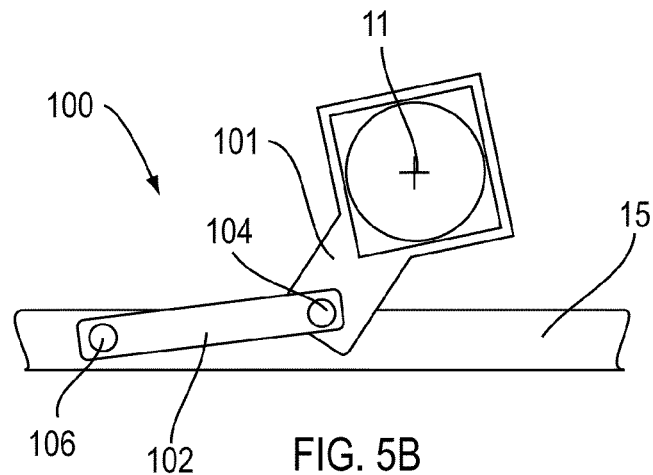
Figure 5C:
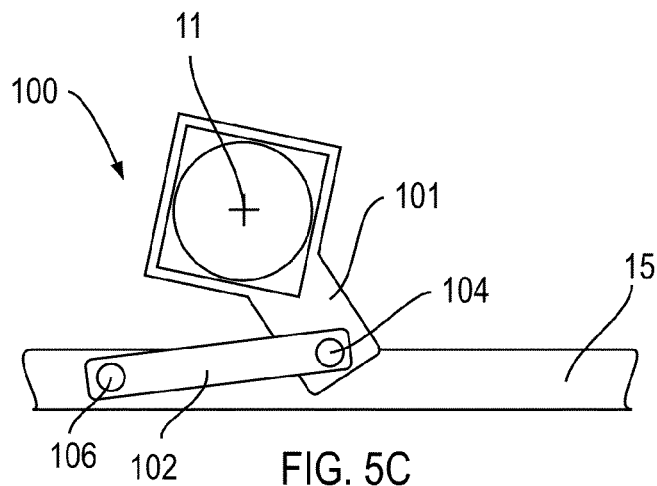

Referring further to the drawings; FIG. 5 depicts an alternate embodiment of a translation mechanism 100. The translation mechanism 100 may include a bracket 101 coupled to the member having rotation axis 11, wherein rotation of the handgrip 12 results in rotation of the bracket 101. The translation mechanism 100 may further include a translation bar 102 coupled between a pivot point 104 coupled to the bracket 101 and pivot point 106 coupled to the translation shaft 15. As the bracket 101 is rotated, the translation bar 102 moves the translation shaft 15 from side to side in response to the rotation of the bracket 101. Other features of the translation mechanism 100 and the flight simulator yoke 10 are the same as previously described.

Figure 6A:
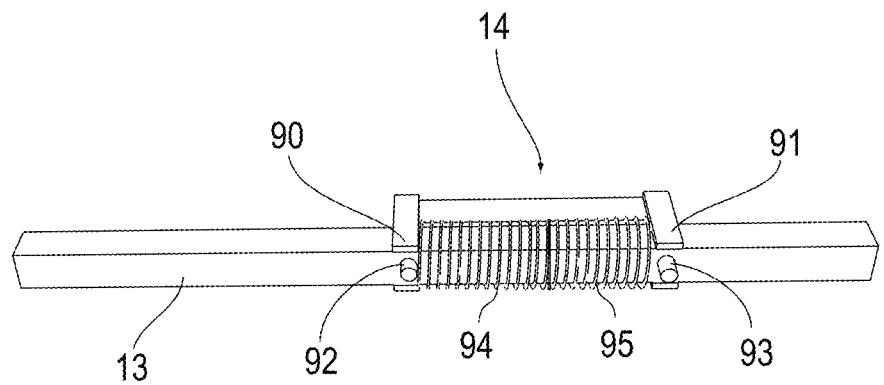
FIGS. 6A-6C are perspective view of a spring device of a flight simulator yoke.

FIG. 6 depicts various views of a spring device 14 in accordance with embodiments of the present invention. The spring device 14 may include a first bracket 90 and a second bracket 91. The spring device 14 may also include a first pin 92 and a second pin 93. Further still the spring device 14 may include a first spring 94 and a second spring 96. The first and second springs 94 and 96 are coupled about shaft 13 adjacent each other and in contact with each other when the shaft 13 is in a neutral position, as shown in FIG. 6A. The brackets 90 and 91 are maintained stationary within the flight simulator yoke 10. The pins are coupled to the shaft 13, and move in response to movement of the shaft 13. The first pin 92 is coupled adjacent the first bracket 90, wherein the first pin 92 and the first bracket 90 each engage an end of the first spring 94, when the shaft 13 is in a neutral position. The second pin 93 is coupled adjacent the second bracket 91, wherein the second pin 93 and the second bracket 91 each engage an end of the second spring 95, when the shaft 13 is in a neutral position.

Figure 6B:
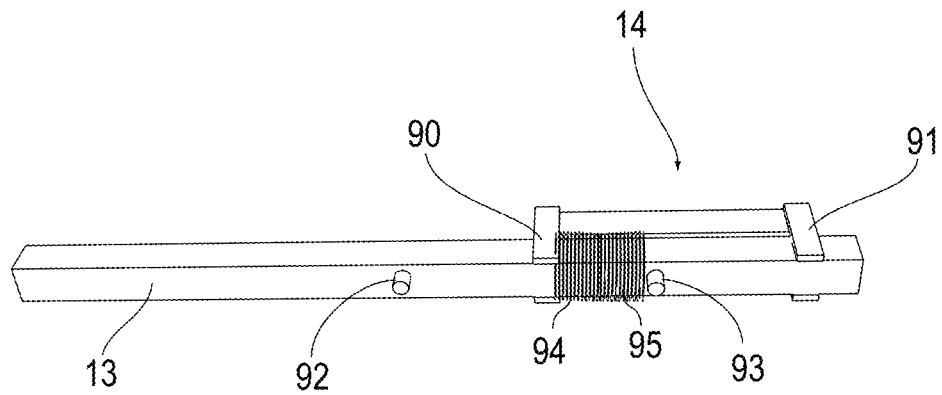
Figure 6C:
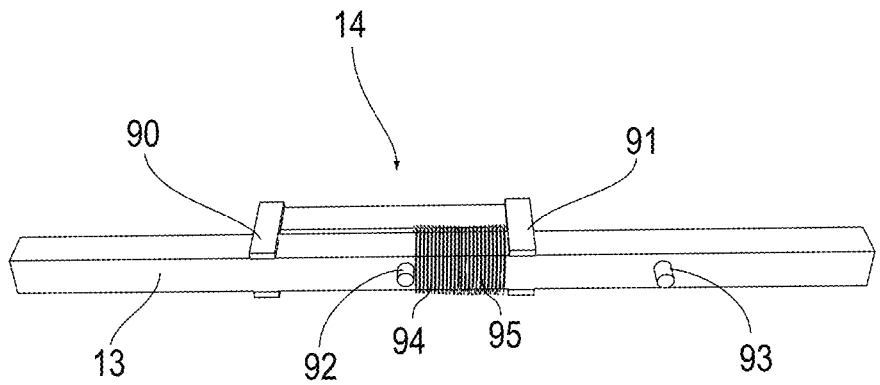

As the shaft 13 is moved in a first direction, as shown in FIG. 6B, the second pin 93 engages the second spring 95 and the first bracket 90 engages the first spring 94 such that the first and second springs 94 and 95 compress until they are fully compressed. As the shaft 13 is moved back into neutral position the springs 94 and 95 are expanded again. The shaft 13 may also be moved in a second direction shown in FIG. 6C. The first pin 92 engages the first spring 94 and the second bracket 91 engages the second spring 95 such that the first and second springs 94 and 95 compress until they are fully compressed. As the shaft 13 is moved back into neutral position the springs 94 and 95 are expanded again. It will be understood that the spring device 16 operates in substantially the same manner as the spring device 14.

Referring again to FIG. 1, the simulator yoke 10 may also include a power source 22, an electrical wire harness and a plurality of wires 24. The power source 22 provides power to the simulator yoke 10 and allows all electric and electronic components to function and operate. The wire harness 23 allows for a central location of connecting wires together and the wire 24 allow for the transmission of particular signals in order to operate the electric and electronic aspects of the simulator yoke, such as, but not limited to movement of the electric trim, the sending and receiving of information via a USB connection to a computer or simulator of information with regard to the position of the simulator yoke 10 and the associated manual movements of the yoke. The power source 22, wire harness 23 and wires 24 essentially allow for the ability of the simulator yoke to operate as well as allow the simulator yoke 10 to communicate with a computer as part of a simulation flight.

Additionally, the simulator yoke 10 may include a base 26. The base 26 may be used to support all of the components of the simulator yoke 10 and may further be used to rest upon a surface during use. According to other embodiments, the base 26 may be secured to a surface within a flight simulator or on a desk by a home computer. The base allows for the yoke 10 to be portable and moved from surface to surface.

Figure 7:
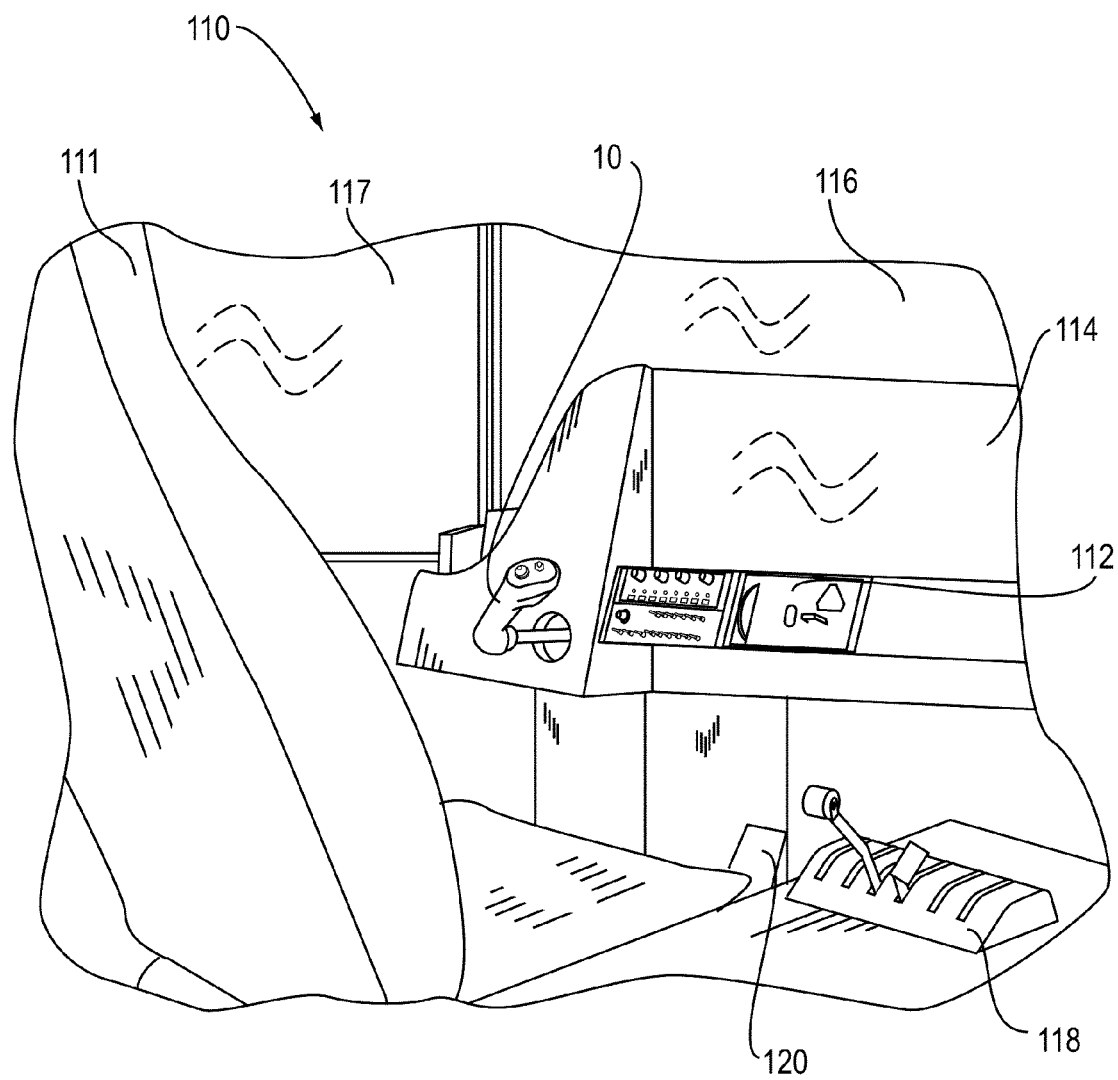
FIG. 7 is a perspective view of a flight simulator having a flight simulator yoke in accordance with the present invention.

Referring again to the drawings, FIG. 7 depicts a flight simulator 110 in accordance with the present invention. The flight simulator 110 may include features typical of a flight simulator, such as, but not limited to a seat 111, instrument panel 112, instrument screen 114, flight screens 116 and 117, throttle controls 118 and pedals 120. The flight simulator may also include a flight simulator yoke 10 in accordance with the present invention. It will be understood that the flight simulator yoke 10 enables the flight simulator to mimic and simulate a Cirrus aircraft.

Referring further to FIGS. 8A-8D, other embodiments of the present invention may include a flight simulator that requires a dual handle flight simulator yoke 130 with a first and second handle 132 and 134 in order to further simulate a Cirrus aircraft. Each handle 132 and 134 has a handgrip 136 and 138. The first handle 132 is operable from a left side of a first user and the second handle 134 operable from the right side of a second user, wherein a neutral position for each the first and second handle 132 and 134 is at a 45 degree angle. The dual handle yoke 130 may include one yoke 10 that may be similar to the yoke previously discussed in the application, where like numbers refer to like components. Referring additionally to FIGS. 1-4, the yoke 10 may include a first trim axis 18 operatively coupled to a yoke shaft 13 in a linear relationship, the first trim axis 18 may be transverse to a second trim axis 20 operatively coupled to the yoke shaft 13 in a translated rotational relationship. Each trim axis 18 and 20 having a liner potentiometer to measure movement along the trim axis.

The yoke 10 may include first and second moveable spring devices 14 and 16 operatively coupled to the trim axes 18 and 20 respectively, such that movement is measured by potentiometers 50 and 70 in response to the respective movement of the first and second spring devices 14 and 16, each spring device having a positive center detent, wherein the positive center detent requires a predetermined amount of force in order to move the yoke shaft 13 along each trim axis 18 and 20.

Figure 8A:
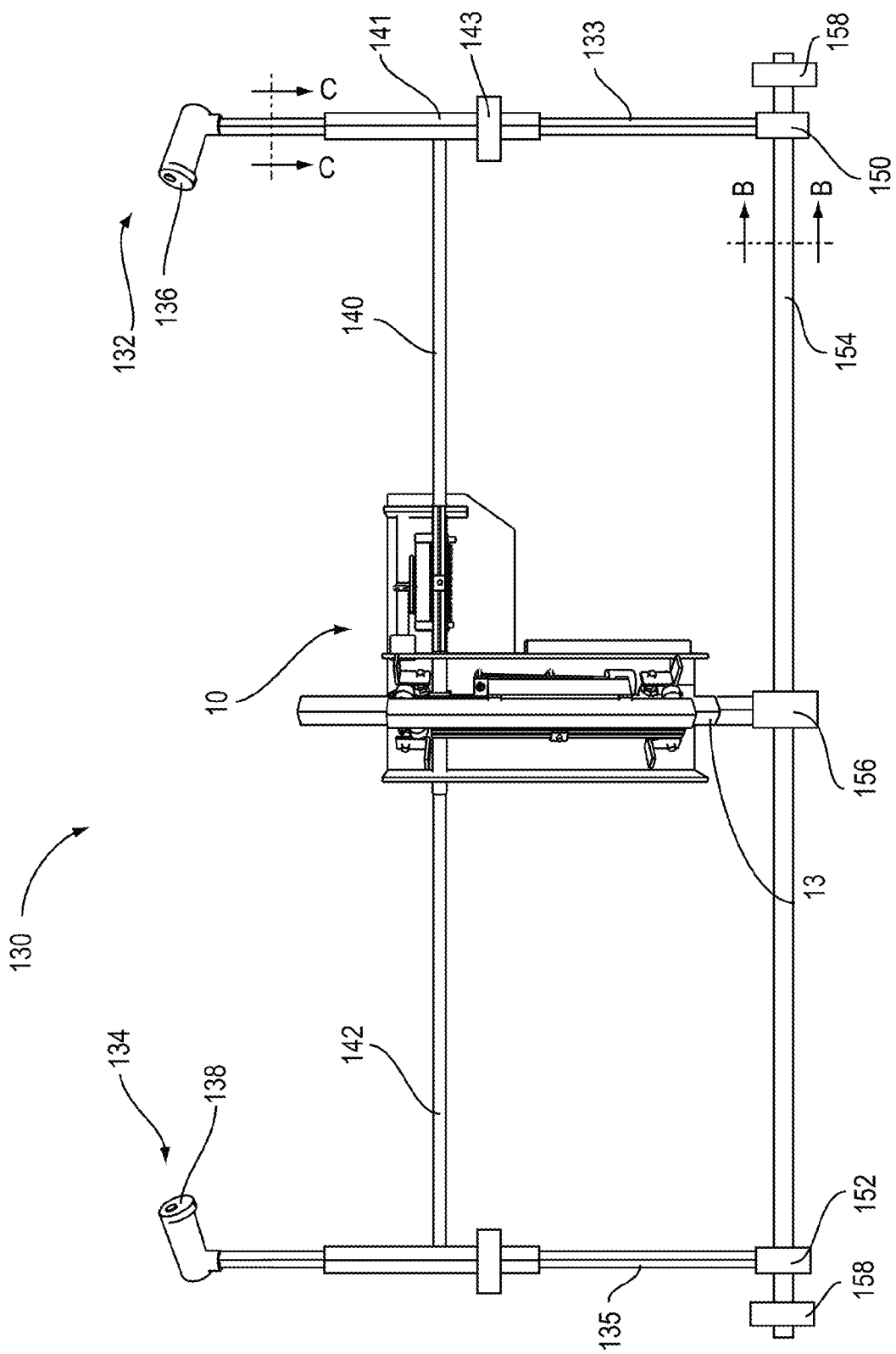
FIG. 8A is a top view of a dual handle flight simulator yoke.
Figure 8B:
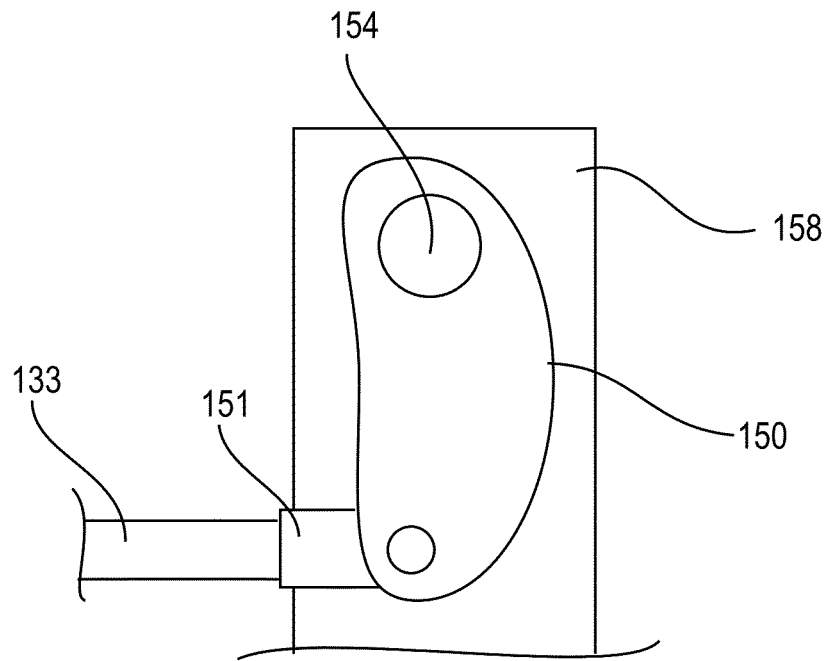
FIG. 8B is a section view of a dual handle flight simulator yoke taken along line B-B of FIG. 8A.
Figure 8C:
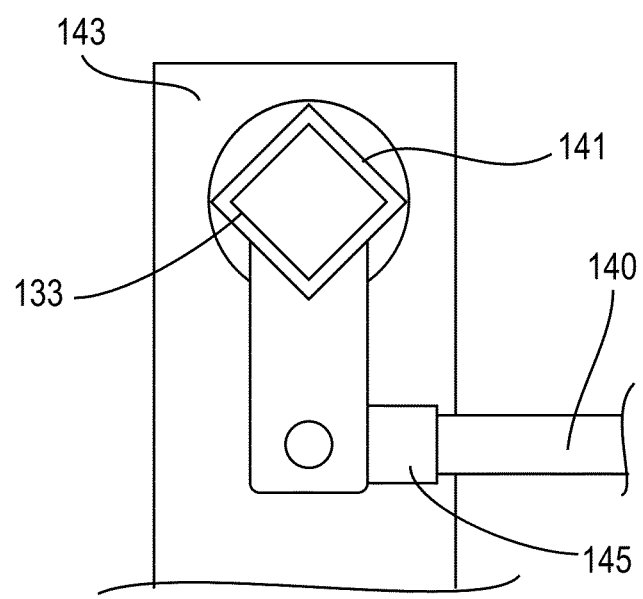
FIG. 8C is a section view of a dual handle flight simulator yoke taken along line C-C of FIG. 8A.

The dual handle yoke 130 may include rotational linking members 140 and 142 operatively coupled between a translation shaft 15 of the yoke 10 and rotatable sleeves 141, wherein the rotation of one of the first and second handle 132 and 134 results in the rotation of one of the sleeves 141, thereby moving one of the rotational linking members 140 and 142 linearly. Referring to FIG. 8C, the sleeve 141 may be held in a position by support member 143 allowing only rotational movement of the sleeve 141. The rotational linking members 140 and 142 may be coupled to the sleeve 141 by ball joint 145, thereby allowing the rotational movement of the sleeve 141 to translate into linear movement of the rotational linking members 140 and 142. The linear movement of one of the rotational linking members 140 and 142 results in linear movement of the translation shaft 15. The linear movement of translation shaft will result in linear movement of one of the rotational linking members 140 and 142 of the handle 132 and 134 that was not rotated. The other handle 132 and 134 will then rotate by the same angular distance and linear movement of the translation shaft.

The dual handle yoke 130 may include linear linking members operatively coupled to the yoke shaft 13 of the yoke 10, wherein the linear movement of the one of the first and second handle 132 and 134 results in the linear movement of the other handle and the yoke shaft 13 a same distance in the same direction. The yoke shaft 13 may be coupled to the linear linking members in an offset configuration to accommodate rotation of the yoke shaft 13 about rotational axis 11. In one embodiment, as shown in FIG. 8A, the linear linking members may include cams 150 and 152 respectively coupled between the first and second handle shafts 133 and 135 and a shaft 154. Another cam 156 may be coupled between the shaft 154 and the yoke shaft 13. Referring to FIG. 8B, a section view of a dual handle flight simulator yoke 130 depicts a linear linking member 150. The other linear linking members 152 and 156 are similar. The shaft 154 may be held in a position by support members 158, allowing only rotation of the shaft 154. The linear linking member 150 may be coupled to the shaft 154, such that the shaft rotates in response to rotation of the linear linking member 150. The first handle shaft 133 may be coupled to the linear linking member 150 by a ball joint 151. The ball joint 151 allows the linear linking member 150 to rotate in response to linear movement of the first handle shaft 150. The other linear linking members 152 and 156 rotate in response to rotation of the shaft 154, thereby allowing the yoke 13 and the second handle shaft 135 to move substantially the same linear distance in the same direction as the movement of the first handle shaft 133.

Figure 8D:
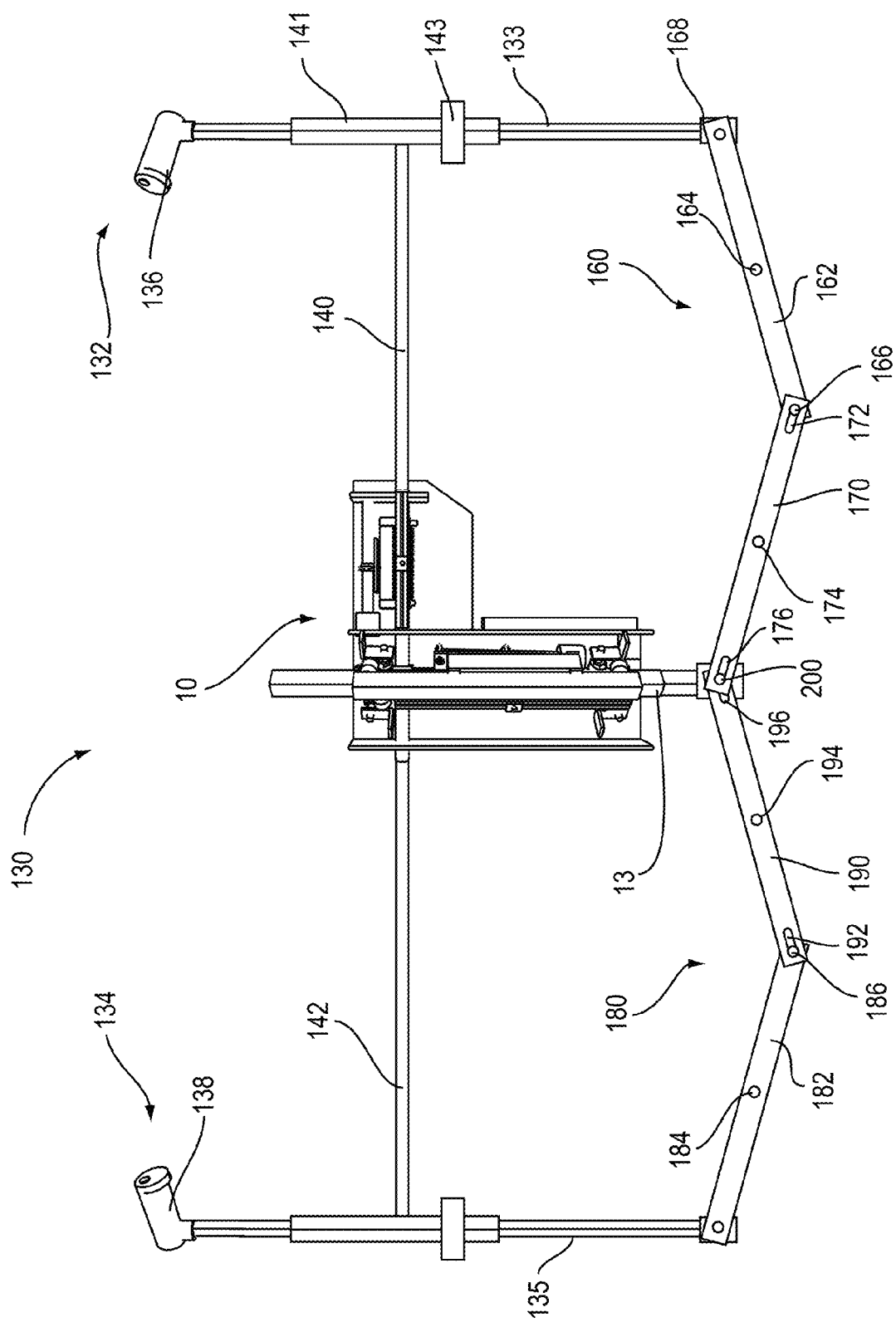
FIG. 8D is a top view of another embodiment of a flight simulator yoke with two handles.
Figure 9:
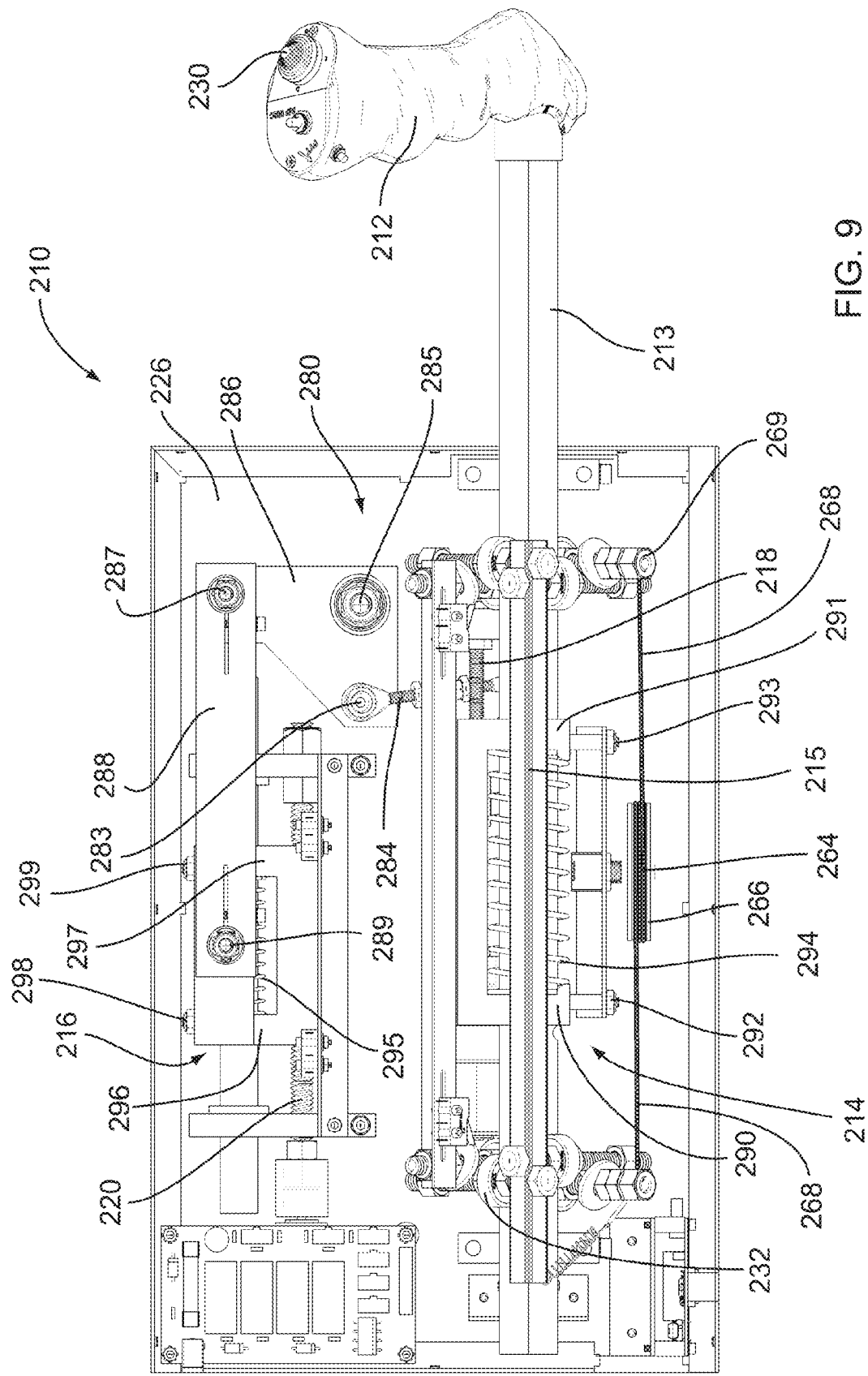
FIG. 9 is a top view of a flight simulator yoke with parallel trim axes.
Figure 10:
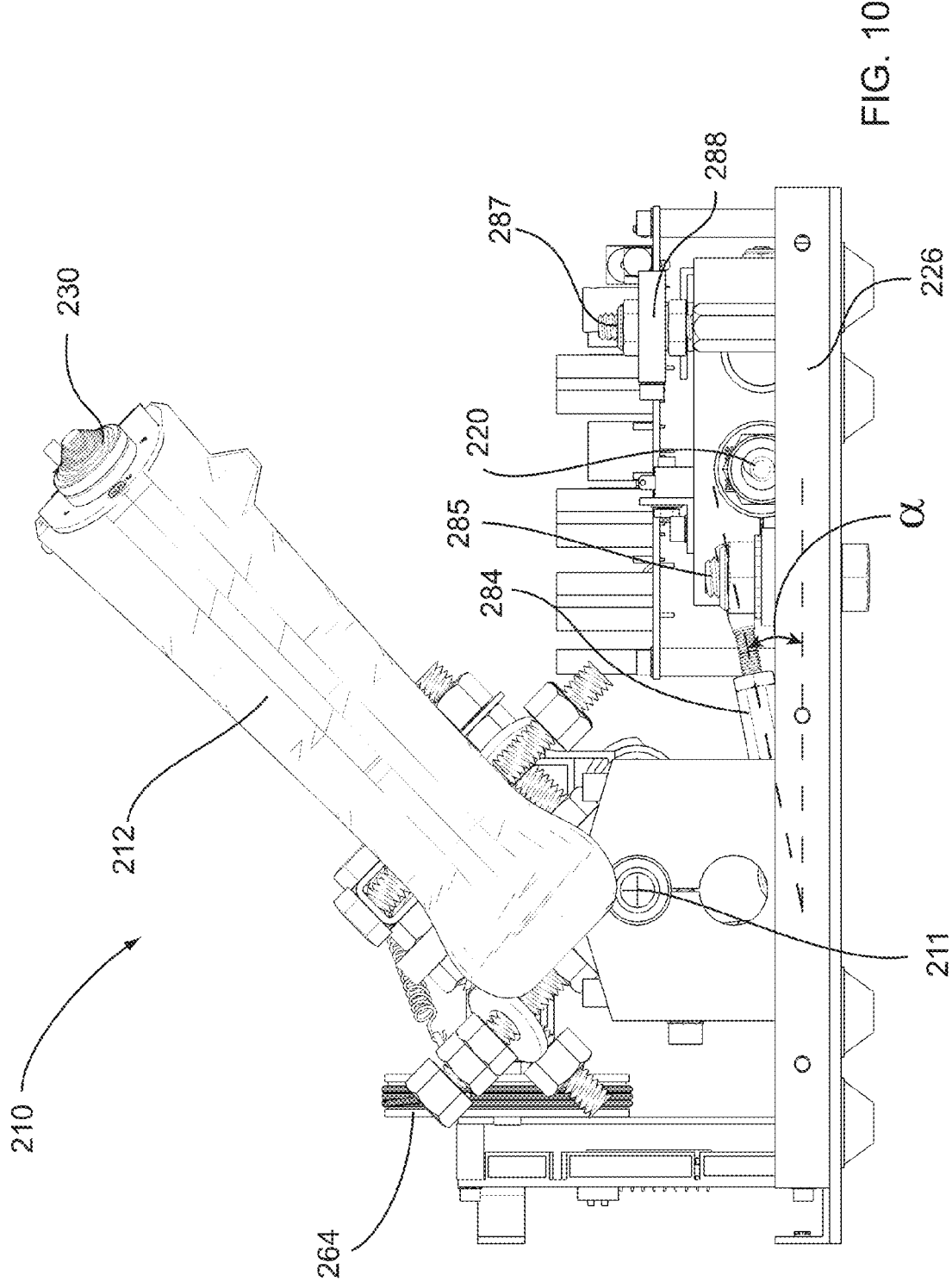
FIG. 10 is a front view a flight simulator yoke with parallel trim axes.
Figure 11:
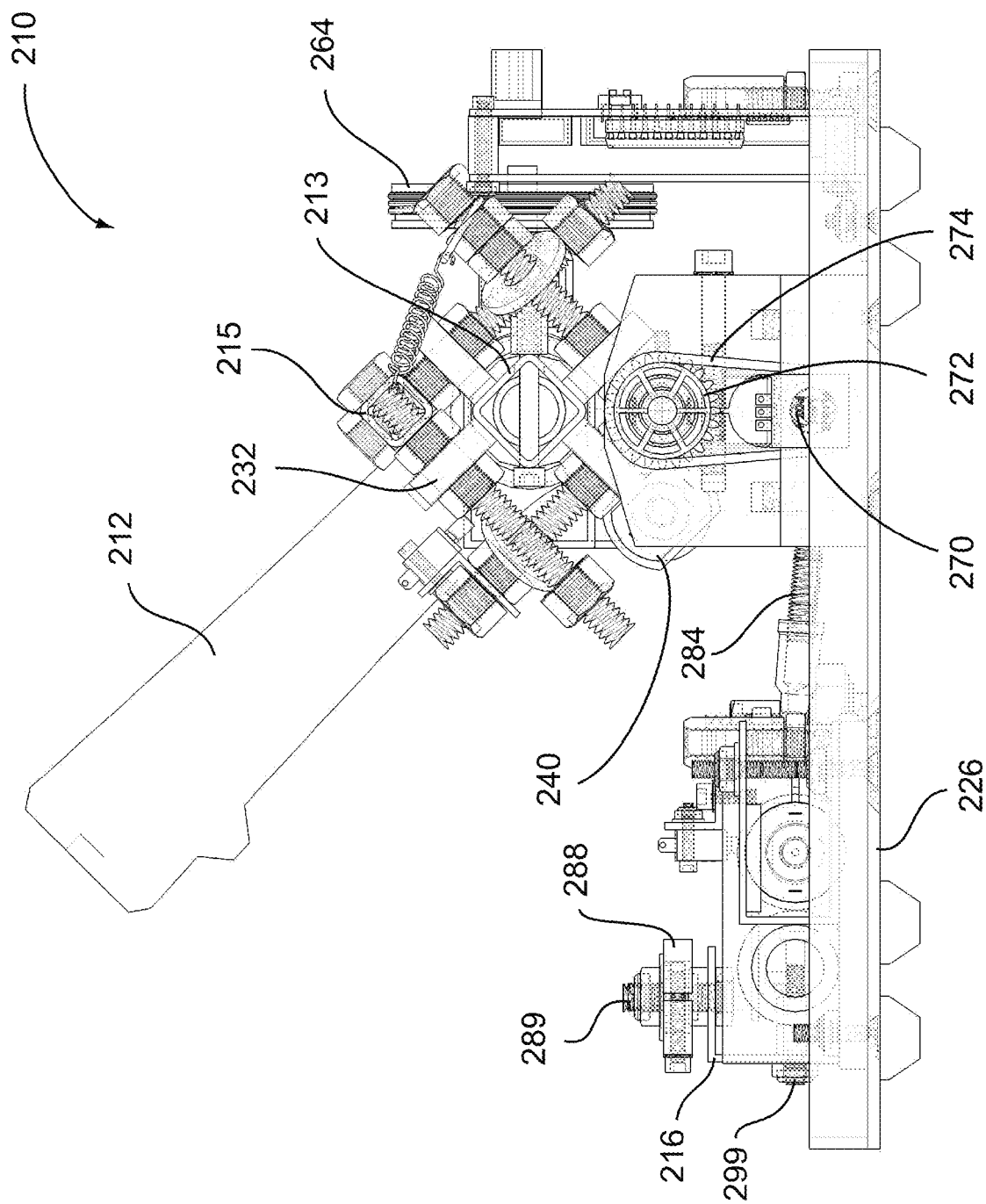
FIG. 11 is a back view of a flight simulator yoke with parallel trim axes.
Figure 12:
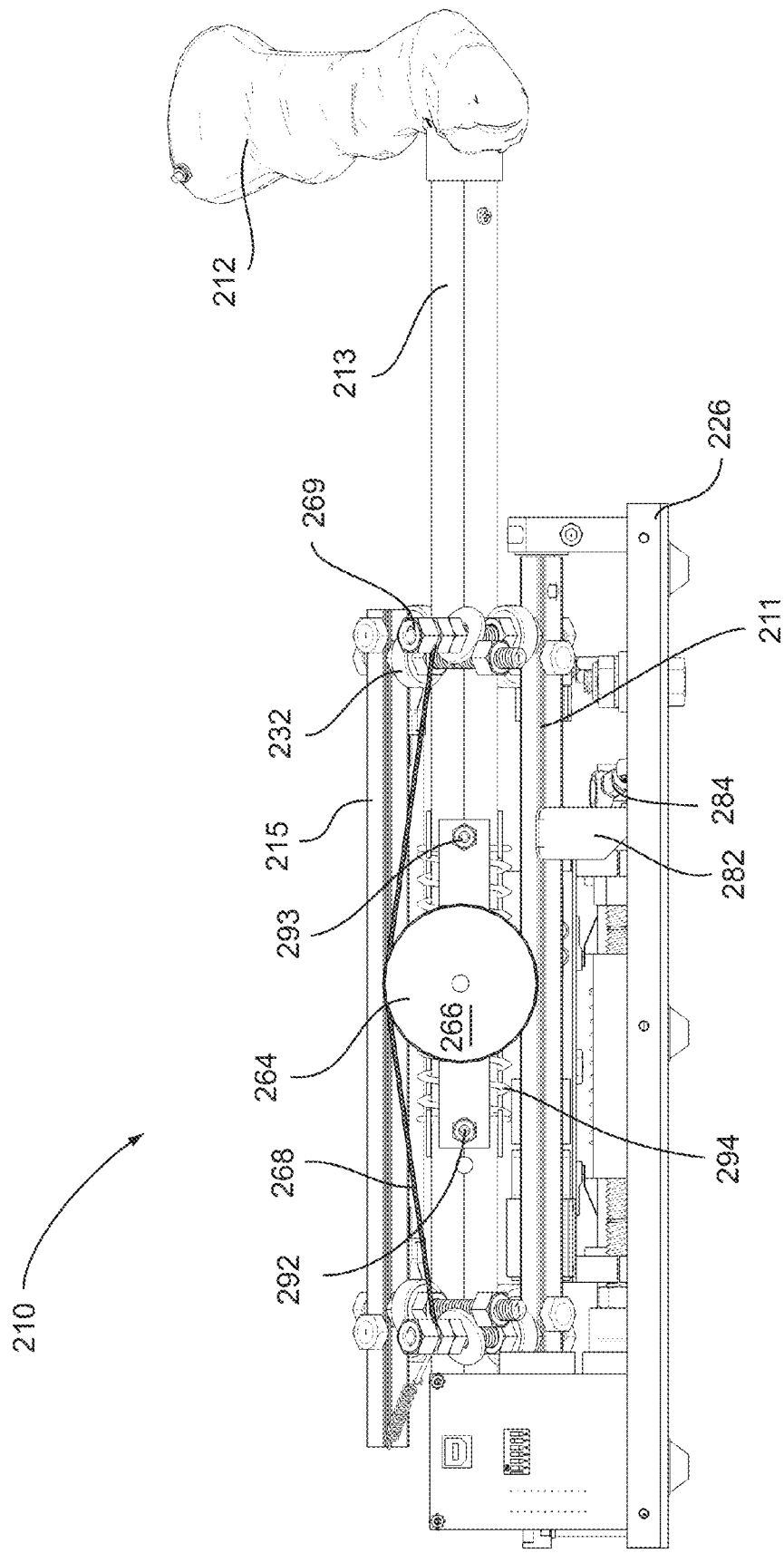
FIG. 12 is a left side view of a flight simulator yoke with parallel trim axes.
Figure 13:
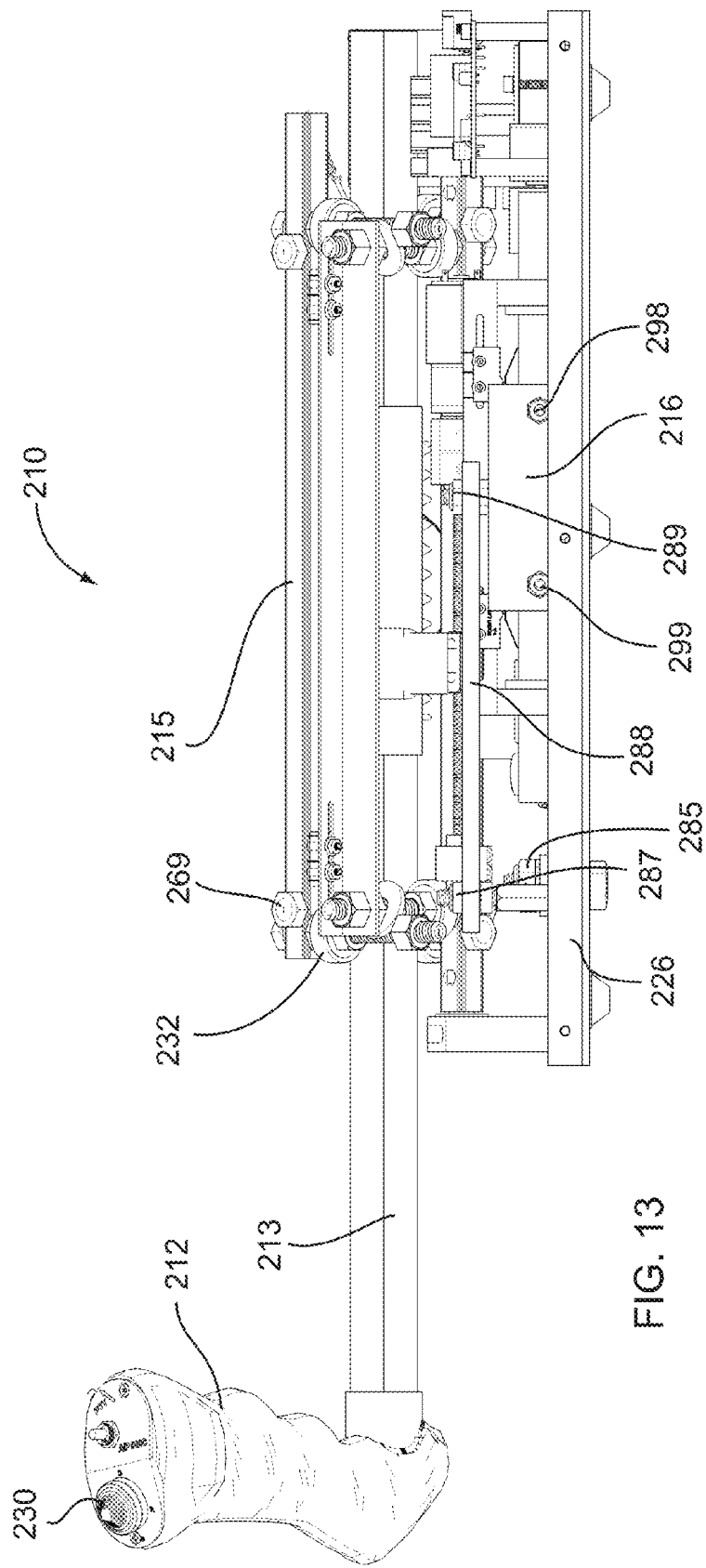
FIG. 13 is a right side view of a flight simulator yoke with parallel trim axes.
Figure 14:
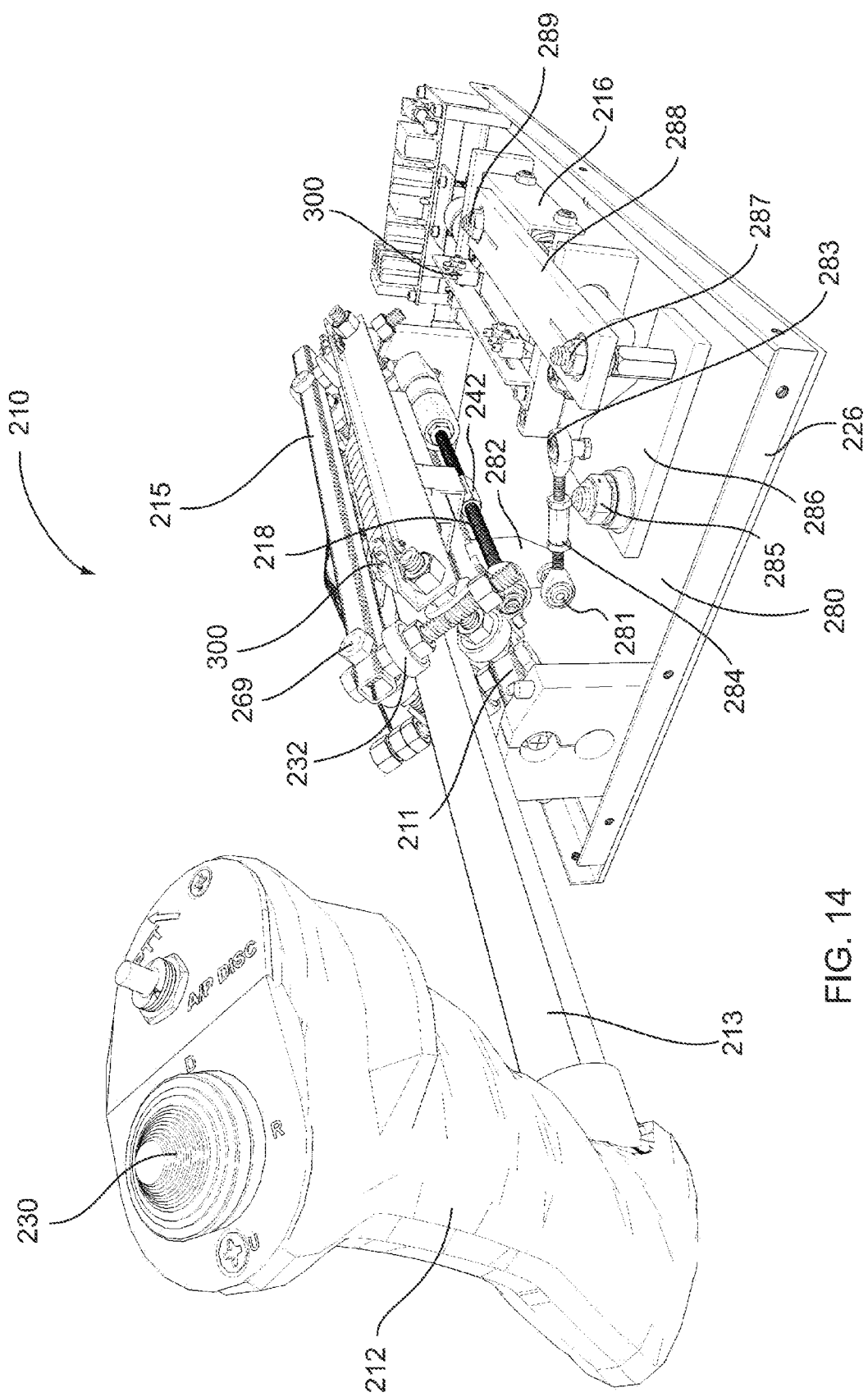
FIG. 14 is a perspective view of a flight simulator yoke with parallel trim axes showing a translation mechanism.
Figure 15:
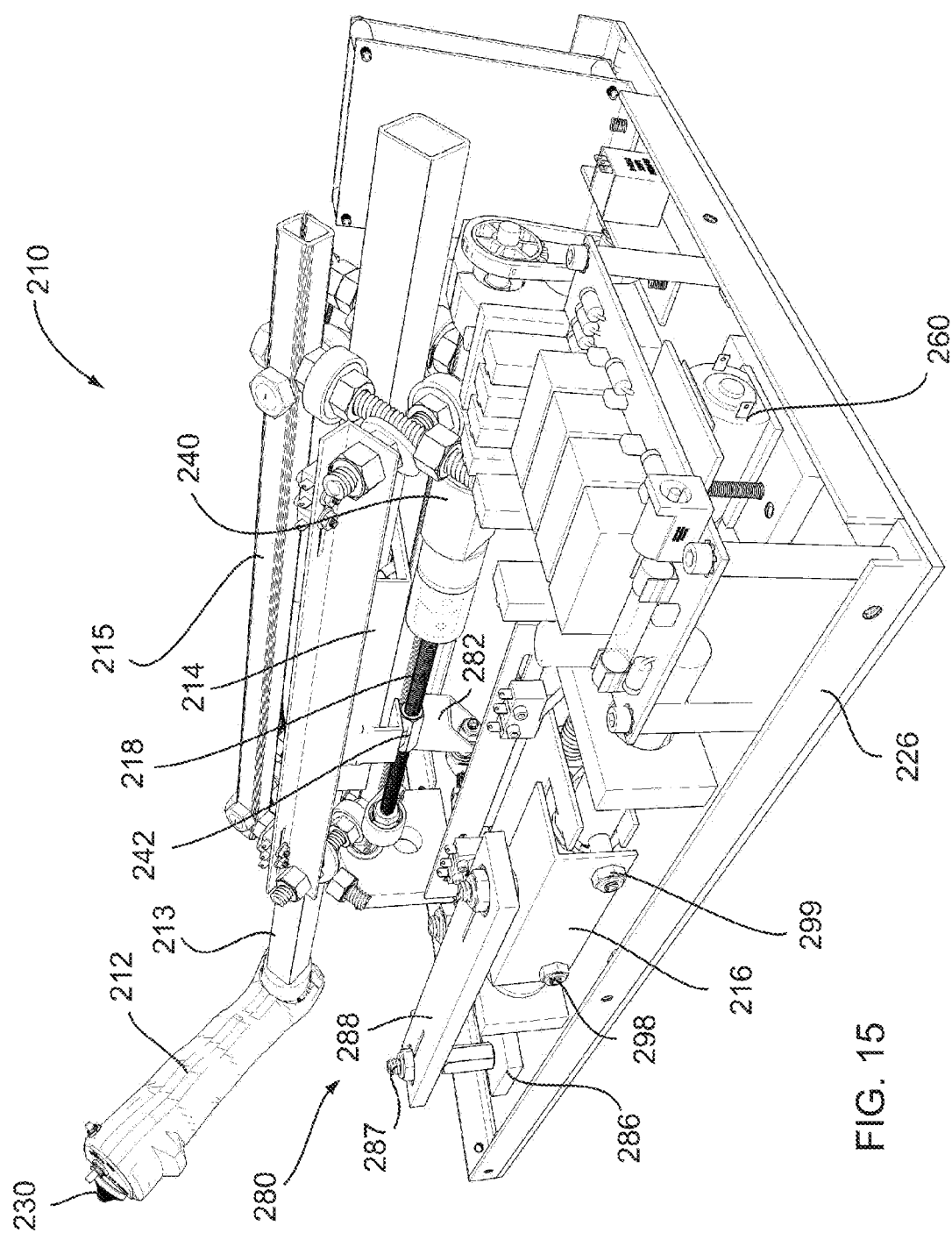
FIG. 15 is another perspective view of a flight simulator yoke with parallel trim axes showing a translation mechanism.

In another embodiment as shown in FIG. 8D, the linear linking members may include a first linking mechanism 160 and a second linking mechanism 180. The first linking mechanism 160 may include a first linking member 162 pivotally coupled on one end to an end of the shaft of the first handle 132. The first linking member 162 may be coupled to a second linking member 170 by a pin 166 coupled to a slot 172 of the second linking member 170. The first linking member 162 has a pivot point 164, wherein the first linking member 162 is rotatable about the pivot point 164. The second linking member 170 has a pivot point 174, wherein the second linking member 170 is rotatable about the pivot point 174. The pin 166 and slot 172 configuration allow for the linking members to rotate in opposite directions without binding. The second linking member 170 may include a second slot 176 coupled to a pin 200. The pin 200 is coupled to the yoke shaft 13. This allows the rotation of the second linking member 170 to translate into linear movement of the yoke shaft 13.

The second linking mechanism 180 may include a first linking member 182 pivotally coupled on one end to an end of the shaft of the second handle 134. The first linking member 182 may be coupled to a second linking member 190 by a pin 186 coupled to a slot 192 of the second linking member 180. The first linking member 182 has a pivot point 184, wherein the first linking member 182 is rotatable about the pivot point 184. The second linking member 190 has a pivot point 194, wherein the second linking member 190 is rotatable about the pivot point 194. The pin 186 and slot 192 configuration allow for the linking members to rotate in opposite directions without binding. The second linking member 190 may include a second slot 196 coupled to a pin 200. The pin 200 is coupled to the yoke shaft 13. This allows the rotation of the second linking member 190 to translate into linear movement of the yoke shaft 13.

This configuration of first and second linking mechanisms 160 and 180 allows the linear movements of one handle to translate into linear movements of the yoke shaft and the other handle.

The rotational linking members 140 and 142 are operatively coupled to one of the second spring device 16, wherein movement of one of the first and second handle 132 and 134 rotationally results in movement of the first spring device 16.

The linear linking members are operatively coupled to the first spring device 14, wherein movement of one of the first and second handle 132 and 134 linearly results in movement of the first spring device 14.

The yoke 10 of the dual handle yoke 130 may further include an electric trim having two bi-directional motors adapted to trim the yoke without manual input on one of the first and second handles. Each of the first and second handles 132 and 134 may comprise a thumb switch operatively coupled to the handgrip wherein the two bi-directional motors operate in response to movement of the thumb switch. The two bi-directional motors are mechanically coupled to threaded rods that are parallel to the two trim axes, wherein the threaded rods move in response to operation of the two motors.

It will be understood that this configuration of a dual handle yoke 130 results in one handle moving simultaneously when the other handle is moved. The movements will be substantially identical in direction and distance. This movement includes movement due to electronic trim adjustments.

Referring to the drawings, FIGS. 9-15 depict a single handle flight simulator yoke 210 according to particular embodiments of the present invention. The simulator yoke 210 may include a handgrip 212, a yoke shaft 213, a first trim axis 218 and a second trim axis 220. The handgrip 212 is coupled to the yoke shaft 213 and allows the handgrip 212 and the yoke shaft 213 to move rotationally about a rotation shaft 211, wherein the axis of the rotation shaft 211 is a predetermined distance from an axis of the yoke shaft 213. The simulator yoke 210 may further include a first spring device 214 and a second spring device 216. Further still, the simulator yoke 210 may include a trim thumb switch 230.

The yoke 210 comprises two axes of movement; a linear axis and a rotational axis. The yoke 210 is moveable linearly in a direction that is parallel with the yoke shaft 213, and the yoke 210 is rotational about an axis that is offset below the yoke shaft 213. The yoke 210 has an initial neutral position that may be adjusted by use of the electric trim and the first and second trim axes 218 and 220. The initial neutral position includes the yoke handgrip 212 in the neutral position with respect to the rotational axis of 45 degrees. It will be understood that from a front view of the yoke 210 the handgrip 212 is angled at approximately 45 degrees up and to the right for a yoke 210 configured for a left-handed unit and angled at approximately 45 degrees up and to the left for a yoke 210 configured for a right-handed unit.

The hand grip 212 simulates the hand grip of a Cirrus SR20 in all aspects including finger recesses as well as being positioned at approximately a forty-five degree angle. The hand grip 212 includes a thumb switch 230. The thumb switch 230 may be operatively coupled to each trim axis 218 and 220. The thumb switch 230 may be moveable back and forth in at least two directions. The direction is associated with the each trim axis 218 and 220. The movement of the thumb switch activates the movement of the electric trim axes 218 and 220.

With regard to the purpose and function of electric trim, it is important to understand how the trim functions in an airplane such as the Cirrus SR20. There are two trim systems; a pitch trim system and a roll trim system. Roll and pitch trim are provided by adjusting the neutral position of a compression spring cartridge in each control system by means of an electric motor. The electric roll trim is also used by the autopilot to position the ailerons. It is possible to easily override full trim or autopilot inputs by using normal control inputs. Ground adjustable trim tabs are installed on the rudder, elevator and right aileron to provide small adjustments in neutral trim. These tabs are factory set and do not normally require adjustment.

With regard to the pitch trim control system, an electric motor changes the neutral position of the spring cartridge attached to the elevator control horn. A conical trim button located on top of each control yoke controls the motor. Moving the switch forward will initiate nose-down trim and moving the switch aft will initiate nose-up trim. Pressing down on the switch will disconnect the autopilot if the autopilot was engaged. Neutral (takeoff) trim is indicated by the alignment of a reference mark on the yoke tube with a tab attached to the instrument panel bolster. The elevator trim also provides a secondary means of aircraft pitch control in the event of a failure in the primary pitch control system not involving a jammed elevator. Elevator (pitch) trim operates on 28 VDC supplied through the 2-amp PITCH circuit breaker on Main Bus 1.

With regard to the roll trim control system, an electric motor changes the neutral position of a spring cartridge attached to the left actuation pulley in the wing. A conical trim button located on top of each control yoke controls the motor. Moving the switch left will initiate left-wing-down trim and moving the switch right will initiate right-wing-down trim. Pressing down on the switch will disconnect the autopilot if the autopilot was engaged. Neutral trim is indicated by the alignment of the line etched on the control yoke with the centering indication marked on the instrument panel. The aileron trim also provides a secondary means of aircraft roll control in the event of a failure in the primary roll control system not involving jammed ailerons. Aileron trim operates on 28 VDC supplied through the 2-amp ROLL TRIM circuit breaker on Main Bus 1.

In aircraft such as the Cirrus SR20, the adjustments made by use of the electric trim not only change the flight attitude of the aircraft, but it further adjusts the attitube of the yoke, or in other words adjusts the neutral position of the yoke, such that the plane will go back to the adjusted flight attitude established by the trim adjustments. Similarly, the adjustment of the electric trim of the present invention adjusts the attitude of the yoke 210 by use of trim axes 218 and 220. The neutral position of the yoke 210 is adjusted in response to adjustment of the yoke 210 along the electric trim axes 218 and 220.

The first electric trim axis 218 includes a motor 240 and a spring device coupler 242. The motor 240 may be a bi-directional motor that allows rotation in two directions. The first trim axis 218 may be a threaded rod, such as but not limited to a drive screw, wherein the spring device coupler 242 travels linearly along the first trim axis 218 in response to the rotation of the trim axis 218 in each rotational direction. The spring device coupler 242 is coupled to the first spring device 214. Therefore, the linear movement of the spring device coupler 242 also moves the spring device linearly along the first trim axis 218 in response to the rotation of the first trim axis 218.

Additionally, the yoke 210 may also comprise sensors 310, wherein two sensors 310 are coupled adjacent the first spring device 214 a predetermined distance apart. Further, two sensors 310 are coupled adjacent the second spring device 216 a predetermined distance apart. The sensors 310 are coupled such that the first and second spring devices 214 and 216 may engage the sensors 310 adjacent each spring device. In response to the first or second spring device 214 or 216 respectively engaging one of the corresponding sensors 310, the first motor 240 or the second motor 260 stop movement in the current direction of rotation and is only allowed rotation in the opposite direction.

The simulator yoke 210 may further include a first potentiometer and a second potentiometer, wherein the first potentiometer 264 measures linear movement of the first spring device 214. The first potentiometer 264, according to some embodiments, may include a rotary potentiometer 264, wherein the potentiometer 264 comprises a pulley 266 with string 268 fixedly coupled to a support bolt 269 of the yoke 210 on one end and to the end of the yoke shaft 213 opposing the handle 212 on the other end. As the spring device 214 moves linearly along the yoke shaft 213, the string 268 functions to rotate a rotational disc of the pulley 266 that further rotates the potentiometer 264, thereby adjusting the resistance of the potentiometer 264 and producing a varied signal with regard to the previous signal. The linear movement of the spring device 214 may be manual movement or movement in response to adjusting the trim by use of the thumb switch 30. For example, the user may apply force to the handle 212 which moves the yoke shaft 213 linearly, and thereby rotates the first potentiometer 264 by moving the opposing end of the yoke shaft 213, resulting in rotation of the pulley 266. This change in resistance is directed to a computer through an electrical connection, wherein the yoke 210 provides a signal to the computer for computer simulator software to function with assistance of a processor to process the signal generated by the yoke 210 to accurately simulate the flying of an aircraft like a Cirrus SR20.

The first spring device 214 has a center position with a positive detent, wherein it requires a predetermined amount of force to manually move the hand grip 212 and the yoke shaft in a direction along the first trim axis 218. Movement of the spring device 214 along the first trim axis 218 moves the center of the first spring device 214. For example, the center detent of the first spring device 214 may be moved in response to the adjustment of the electric trim by use of the thumb switch 230. This accurately simulates the movement of the center detent of the Cirrus SR20 yoke, wherein the center moves along the length of the yoke shaft 213 in response to the trim adjustments. Once the trim is set by use of the thumb switch 230, a new neutral position is provided by having the resting position of the yoke shaft in the orientation established by the change in location of the first spring device 214.

The second electric trim axis 220 includes a motor 260 and a spring device coupler. The motor 260 may be a bi-directional motor that allows rotation in two directions. The second trim axis 220 may be a threaded rod, such as but not limited to a lead screw, wherein the spring device coupler travels linearly along the second trim axis 220 in response to the rotation of the trim axis 220 in each rotational direction. The spring device coupler is coupled to the second spring device 216. Therefore, the linear movement of the spring device coupler also moves the spring device linearly along the second trim axis 220 in response to the rotation of the second trim axis 220.

The yoke 210 may further comprise a second rotary potentiometer 270 operatively coupled to the rotational shaft 211. For example, second potentiometer 270 may be coupled to a gear 272 coupled to an end of the rotational shaft 211, wherein the gear is connected to the potentiometer 270 by use of a belt 274, wherein rotation of the shaft 211 results in rotation of the rotary potentiometer 270. The second potentiometer 270 may be utilized to communicate the angular position of the hand grip 212 and the yoke shaft 213. This angular position may also be adjusted by movement of the second spring device 216 and the center of the second spring device 216 in order to accurately communicate said position to a computer for use in a simulated flight.

The second spring device 216 has a center position with a positive detent, wherein it requires a predetermined amount of force to manually move the hand grip 212 and the yoke shaft in a direction along the second trim axis 220. Movement of the spring device 216 along the second trim axis 220 moves the center of the second spring device 216 in response to the adjustment of the electric trim by use of the thumb switch 230 in moving the thumb switch 230 in a direction transverse to the yoke shaft 213. The movement of the second spring device moves the linear member 288. Movement of linear member 288 rotates rotational member 286. Rotation of the rotational member 286 moves the adjustable linkage 284, which thereby moves yoke shaft member 282 that results in rotation of the yoke shaft 213 and ultimately the rotation handle 212. This accurately simulates the movement of the center of the Cirrus SR20 yoke, wherein the center moves along the second trim axis 220 in response to the trim adjustments. Once the trim is set by use of the thumb switch 230, a new neutral position is provided by having the resting position of the yoke shaft in the orientation established by the change in location of the first spring device 216.

It will be understood that movement of the spring devices 214 and 216 along their respective trim axes results in defining a new neutral position of the handle 212 and yoke shaft 213, wherein neutral is determined as no external force acting on the handle 212. The use of trim in an aircraft changes the attitude of the aircraft, such as placing the airplane in a descent or an ascent. Accordingly, the electric trim of the simulator yoke 210 functions to provide a simulation of the electric trim of the Cirrus SR20 yoke, and further provides for input to the computer for use with a simulation software.

Embodiments of the flight simulator yoke 210 comprise a translation mechanism 280 in accordance with the embodiments of the present invention. The translation mechanism 280 allows for the rotational movement of the handgrip 212 and the yoke shaft 213 about the rotation shaft 211, wherein the rotation shaft 211 is a predetermined distance from an axis of the yoke shaft 213. In order for the rotational movement of the handgrip 212 and the yoke shaft 213 to simulate the rotational movement of a Cirrus SR20 yoke, there needs to be a translation of the rotational movement of the handgrip 212 and yoke shaft 213 into a linear movement along the direction of the second trim axis 220. Accordingly, the translation mechanism 280 provides this translational movement. The translation mechanism 280 may include a yoke shaft member 282, an adjustable linkage 284, a rotational member 286 and a linear member 288. The adjustable linkage 284 is operatively coupled between the yoke shaft member 282 and the rotational member 286, wherein the adjustable linkage 284 established an angle α with respect to the base 226 of the yoke 210 when the hand grip 212 is at substantially 45 degrees. For the exemplary purposes of this disclosure, the adjustable linkage 284 may include pivot points on each end at pivot point 289 and pivot point 292 on the rotational member 286, thereby allowing rotation of the yoke shaft member 282 to rotate in one plane and the rotational member 286 to rotate in another plane transverse to the plane of rotation of the yoke shaft member 282. The linear member 288 is operatively coupled between the second moveable spring device 216 and the rotational member 286. The linear member 286 is coupled to the rotational member 286 at pivot point 294. This pivot point 294 allows for translation of the rotational movement of the rotational member 286 to the linear movement of the linear member 286.

In operation, the rotational member 286 rotates about an axis, such as the axis of pivot point 290 in response to the rotation of the yoke shaft member 282 about the yoke rotational shaft 211. The linear member 288 moves linearly in response to rotation of the rotational member 286 about pivot point 290. The second moveable spring device 216 moves linearly along the second trim axis 220 in response to linear movement of the linear member 288.

The yoke shaft 213 further comprises a yoke shaft support system. The support system comprises a support shaft wherein support bolts that couple rollers or bearings 232 to the support shaft, wherein the bearings 232 operatively engage the yoke shaft 213. The bearings 232 allow the yoke shaft 213 to move linearly with little friction and provide a feel similar to the actual aircraft.

The spring device 214 may include a first bracket 290 and a second bracket 291. The spring device 214 may also include a first pin 292 and a second pin 293. Further still the spring device 214 may include a spring 294. The spring 294 is coupled about yoke shaft 213. The brackets 290 and 291 are maintained stationary within the flight simulator yoke 210. The pins 292 and 293 are coupled to the yoke shaft 213, and move in response to movement of the yoke shaft 213. The first pin 292 is coupled adjacent the first bracket 290, wherein the first pin 292 and the first bracket 290 each engage an end of the spring 294, when the yoke shaft 213 is in a neutral position. The second pin 293 is coupled adjacent the second bracket 291, wherein the second pin 293 and the second bracket 291 each engage an end of the second spring 295, when the yoke shaft 213 is in a neutral position.

As the yoke shaft 213 is moved in a first direction, the second pin 293 engages the other end of spring 294 and the first bracket 90 engages an end of the spring 294 such that the spring 294 compresses until it is fully compressed. As the yoke shaft 213 is moved back into neutral position the spring 294.

The yoke shaft 213 may also be moved in a second direction. The first pin 292 engages the first spring 294 and the second bracket 291 engages the second spring 295 such that the spring 294 compresses until they are fully compressed. As the yoke shaft 213 is moved back into neutral position the spring 94 are expanded again. It will be understood that the spring device 216 operates in substantially the same manner as the spring device 214.

It will be understood that all the proper circuitry provides the proper connection and interface with a computer and the software.

Accordingly, the components defining any flight simulator yoke implementation may be formed of any of many different types of materials or combinations thereof that can readily be formed into shaped objects provided that the components selected are consistent with the intended operation of a flight simulator yoke implementation. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any flight simulator yoke implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or or the like for example, depending on, among other considerations, the particular material forming the components.

Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention in a realistic simulation of the operation and feel of a Cirrus SR20 yoke in order to provide pilot training. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A portable flight simulator yoke comprising:
a single handle having a handgrip and yoke shaft, wherein a neutral position for the handle is at a 45 degree angle;
a first trim axis comprising a potentiometer to measure linear movement of the single handle;
a second trim axis substantially parallel to the first trim axis, wherein the second trim axis comprises a potentiometer to measure rotational movement of the single handle;
a first and second moveable spring devices, each operatively and respectively coupled to the first and second trim axes such that movement of the single handle is measured by the potentiometers in response to movement of the spring devices, each spring device having a positive center detent, wherein the positive center detent requires a predetermined amount of force in order to move the yoke along each trim axis;
an electric trim having two bi-directional motors adapted to trim the yoke without manual input on the handle;
a thumb switch operatively coupled to the handgrip wherein the two bi-directional motors operate in response to movement of the thumb switch; and
wherein the two bi-directional motors are mechanically coupled to threaded rods that are parallel to the two trim axes, wherein the threaded rods move in response to operation of the two motors.

2. The flight simulator yoke of claim 1, wherein each spring device moves along a threaded rod corresponding to a trim axis in response to operation of the corresponding bi-directional motor, each direction of movement of the spring device corresponding to a direction of rotation of the corresponding bi-directional motor.

3. The flight simulator yoke of claim 2, wherein the positive center detent of each spring device moves along the corresponding trim axis in response to movement of each spring device.

4. The flight simulator yoke of claim 1, further comprising a translation mechanism to translate rotational movement of the handle to linear movement of the second moveable spring device.

5. The flight simulator yoke of claim 4, wherein the translation mechanism comprises a yoke shaft member, an adjustable linkage, a rotational member and a linear member.

6. The flight simulator yoke of claim 5, wherein the adjustable linkage is operatively coupled between the yoke shaft member and the rotational member.

7. The flight simulator yoke of claim 6, wherein the linear member is operatively coupled between the second moveable spring device and the rotational member.

8. The flight simulator yoke of claim 7, wherein the rotational member rotates about an axis in response to the rotation of the yoke shaft member about a yoke rotational shaft; the linear member moves linearly in response to rotation of the rotational member; and the second moveable spring device moves linearly along the second trim axis in response to linear movement of the linear member.

9. A flight simulator having a flight simulator yoke, the simulator comprising:
- a seat;
- a control panel;
- screens for displaying flight information and simulation;
- throttle controls;
- pedals; and
- a flight simulator yoke comprising:
  - a single handle having a handgrip and yoke shaft, wherein a neutral position for the handle is at a 45 degree angle;
  - a first trim axis comprising a potentiometer to measure linear movement of the single handle;
  - a second trim axis substantially parallel to the first trim axis, wherein the second trim axis comprises a potentiometer to measure rotational movement of the single handle;
  - a first and second moveable spring devices, each operatively and respectively coupled to the first and second trim axes such that movement of the single handle is measured by the potentiometers in response to movement of the spring devices, each spring device having a positive center detent, wherein the positive center detent requires a predetermined amount of force in order to move the yoke along each trim axis;
  - a translation mechanism comprising a yoke shaft member, an adjustable linkage, a rotational member and a linear member, the adjustable linkage operatively coupled between the yoke shaft member and the rotational member, wherein the translation mechanism translates rotational movement of the handle to linear movement of the second moveable spring device;
  - the rotational member rotates about an axis in response to the rotation of the yoke shaft member about a yoke shaft axis; and
  - the linear member operatively coupled between the second moveable spring device and the rotational member, the linear member moves linearly in response to rotation of the rotational member, and the second moveable spring device moves linearly along the second trim axis in response to linear movement of the linear member.

* * * * *